US011766925B2

(12) United States Patent
Landvik et al.

(10) Patent No.: US 11,766,925 B2
(45) Date of Patent: Sep. 26, 2023

(54) BATTERY MODULE SUPPORT ARRANGEMENT

(71) Applicant: Volvo Truck Corporation, Gothenburg (SE)

(72) Inventors: Sondre Landvik, Gothenburg (SE); Mikael Boisen, Gothenburg (SE); Guilherme Selbach, Hisings Backa (SE); Krister Andersson, Särö (SE)

(73) Assignee: Volvo Truck Corporation, Gothenburg (SE)

( * ) Notice: Subject to any disclaimer, the term of this patent is extended or adjusted under 35 U.S.C. 154(b) by 190 days.

(21) Appl. No.: 17/345,736

(22) Filed: Jun. 11, 2021

(65) Prior Publication Data

US 2021/0387519 A1 Dec. 16, 2021

(30) Foreign Application Priority Data

Jun. 16, 2020 (EP) ..................................... 20180282

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/60* (2019.02); *B62D 21/02* (2013.01);
(Continued)

(58) Field of Classification Search
CPC ... B60K 1/04; B60K 2001/0405; B60L 50/60; B62D 21/02; H01M 50/204; H01M 50/244; H01M 50/249; H01M 2220/20
See application file for complete search history.

(56) References Cited

U.S. PATENT DOCUMENTS

| 4,883,725 A | 11/1989 | Gérard |
| 5,501,504 A | 3/1996 | Kunz |

(Continued)

FOREIGN PATENT DOCUMENTS

| CN | 206456437 U | 9/2017 |
| CN | 208484529 U | 2/2019 |

(Continued)

OTHER PUBLICATIONS

European Search Report for EP 20180282.4 dated Nov. 16, 2020, 8 pages.

(Continued)

*Primary Examiner* — Jason D Shanske
*Assistant Examiner* — James J Triggs
(74) *Attorney, Agent, or Firm* — Withrow & Terranova, PLLC

(57) ABSTRACT

The present disclosure relates to a battery module support arrangement for supporting a battery module to a longitudinally extending frame rail of an electrified heavy vehicle; the battery module support arrangement comprising a pair of triangularly shaped support brackets spaced apart from each other, each of the triangularly shaped support brackets comprising a rail attachment portion for connecting the triangularly shaped support bracket to the longitudinally extending frame rail, and an angled portion extending downwardly between the rail attachment portion and a lower end portion of the triangularly shaped support bracket, wherein a first one of the triangularly shaped support brackets comprises at least one battery module support portion positioned along the angled portion of the first support bracket, and a second one of the triangularly shaped support brackets comprises a pair of battery module support portions positioned along the angled portion of the second support bracket, wherein the battery module support portion of first (Continued)

support bracket is arranged at a different position along the angled portion compared to the position of the battery module support portions of the second support bracket.

16 Claims, 6 Drawing Sheets

(51) Int. Cl.
*H01M 50/249* (2021.01)
*H01M 50/244* (2021.01)
*H01M 50/204* (2021.01)
*B62D 21/02* (2006.01)

(52) U.S. Cl.
CPC ....... *H01M 50/204* (2021.01); *H01M 50/244* (2021.01); *H01M 50/249* (2021.01); *B60K 2001/0405* (2013.01); *H01M 2220/20* (2013.01)

(56) References Cited

U.S. PATENT DOCUMENTS

| | | | |
|---|---|---|---|
| 6,641,206 | B1 | 11/2003 | Bergstrom et al. |
| 10,493,837 | B1 | 12/2019 | Angelo et al. |
| 11,124,076 | B1 | 9/2021 | Borghi et al. |
| 11,400,829 | B1 | 8/2022 | Hajimiri |
| 2011/0174561 | A1 | 7/2011 | Bowman |
| 2012/0097466 | A1* | 4/2012 | Usami ................ B60K 1/04 180/68.5 |
| 2014/0166381 | A1 | 6/2014 | Ling et al. |
| 2018/0201110 | A1 | 7/2018 | Yin et al. |
| 2019/0382050 | A1 | 12/2019 | Alla |
| 2020/0259143 | A1 | 8/2020 | Sloan et al. |
| 2021/0094400 | A1 | 4/2021 | Loacker |
| 2021/0155224 | A1 | 5/2021 | McKibben et al. |
| 2021/0188069 | A1 | 6/2021 | Friedman |
| 2021/0284005 | A1 | 9/2021 | Yun |
| 2021/0362579 | A1 | 11/2021 | Kumagai |
| 2021/0380001 | A1 | 12/2021 | Horder et al. |
| 2021/0387519 | A1 | 12/2021 | Landvik et al. |
| 2021/0387534 | A1 | 12/2021 | Sjöholm |
| 2022/0097537 | A1 | 3/2022 | Prothery et al. |
| 2022/0105815 | A1 | 4/2022 | Björkman et al. |
| 2022/0111716 | A1 | 4/2022 | McKibben et al. |
| 2022/0111717 | A1 | 4/2022 | Hendriks et al. |
| 2022/0126706 | A1 | 4/2022 | Ragot et al. |
| 2022/0161680 | A1 | 5/2022 | Landvik et al. |
| 2022/0185089 | A1 | 6/2022 | Hendriks et al. |
| 2022/0281306 | A1 | 9/2022 | Landvik |

FOREIGN PATENT DOCUMENTS

| | | | |
|---|---|---|---|
| DE | 102015015504 A1 | 6/2016 | |
| DE | 102017007490 A1 | 2/2019 | |
| DE | 102019005927 A1 | 2/2020 | |
| EP | 2938530 A1 | 11/2015 | |
| EP | 3103666 A1 * | 12/2016 | ............... B60K 1/04 |
| EP | 3103666 A1 | 12/2016 | |
| WO | 2014100863 A1 | 7/2014 | |
| WO | 2020074105 A1 | 4/2020 | |

OTHER PUBLICATIONS

Non-Final Office Action for U.S. Appl. No. 17/345,306, dated Nov. 25, 2022, 7 pages.

Extended European Search Report for European Patent Application No. 20180339.2, dated Nov. 17, 2020, 7 pages.

* cited by examiner

BATTERY MODULE SUPPORT ARRANGEMENT

The present application claims priority to European Patent Application No. 20180282.4, filed on Jun. 16, 2020, and entitled "BATTERY MODULE SUPPORT ARRANGEMENT," which is incorporated herein by reference in its entirety.

TECHNICAL FIELD

The present disclosure relates to a battery module support arrangement, a chassis arrangement comprising such a battery module support arrangement, and an electrified heavy vehicle. The battery module support arrangement is configured to support a battery module of an electrified heavy vehicle. Although the battery module support arrangement and the chassis arrangement will mainly be described in relation to a truck, these arrangements are also applicable for other electrified heavy vehicles.

BACKGROUND

One challenge in the development of electrified heavy vehicles lies in the attachment of the propulsion batteries to the frame of the vehicle. Using currently available battery technology, the batteries become considerably heavier than subsystem that are attached to the frame in conventionally powered heavy vehicles. This means that the requirements on the connection between the batteries and the frame are particularly severe since electrified trucks should exhibit satisfactory behavior during normal operation, as well as in the event of a collision.

SUMMARY

It is an object of the present disclosure to describe a battery module support arrangement which provides for satisfactory behavior during operation of an electrified heavy vehicle, as well as enables for modularity of such electrified heavy vehicle comprising more than one battery module for propulsion. This is at least partly achieved by a battery module support arrangement according to claim 1.

According to a first aspect, there is provided a battery module support arrangement for supporting a battery module to a longitudinally extending frame rail of an electrified heavy vehicle; the battery module support arrangement comprising a pair of triangularly shaped support brackets spaced apart from each other, each of the triangularly shaped support brackets comprising a rail attachment portion for connecting the triangularly shaped support bracket to the longitudinally extending frame rail, and an angled portion extending downwardly between the rail attachment portion and a lower end portion of the triangularly shaped support bracket, wherein a first one of the triangularly shaped support brackets comprises at least one battery module support portion positioned along the angled portion of the first support bracket, and a second one of the triangularly shaped support brackets comprises a pair of battery module support portions positioned along the angled portion of the second support bracket, wherein the battery module support portion of first support bracket is arranged at a different position along the angled portion compared to the position of at least one of the battery module support portions of the second support bracket.

The angled portion should be readily understood as a downwardly extending arm of the triangularly shaped support bracket. According to an example, the triangularly shaped support bracket may preferably be arranged as a right-angled triangle. In such case, the angled portion forms the hypothenuse of the right-angled triangle. The battery module support portions of the first and second triangularly shaped support brackets are thus arranged along the hypothenuse. Preferably, the battery module support portions are arranged at a distance from end portions of the hypothenuse. The support portions may be arranged as bushings.

Furthermore, the wording "different position" should be understood such that the at least one battery module support portion of first support bracket is arranged at a different distance from the rail attachment portion compared to the distance between the rail attachment portion and at least one of the battery module support portions of the second support bracket.

The inventors of the present disclosure have realized that by providing triangularly shaped support bracket, the support portions can be positioned at a relatively large distance from each other compared to the use of a horizontal bracket. By means of the at least one battery module support portion on the first triangularly shape support bracket and the pair of battery module support portions on the triangularly shaped support bracket, a three-point suspension of the battery module is achieved, which provides for improved torsional flexibility. This is particularly advantageous for a suspension arrangement connected to a vehicle frame, which is exposed to relatively severe torsional loads during operation. Furthermore, by providing triangularly shaped support brackets of similar/same dimensions, a fictious angled plane extending through the battery pack is provided.

The three-point suspension can also be arranged as a pseudo-three-point suspension by providing two battery module support portions in close vicinity to each other along the angled portion of the first triangularly shaped support bracket.

According to an example embodiment, the battery module support portion of first triangularly shaped support bracket may be arranged at a position between the battery module support portions of the second triangularly shaped support bracket, as seen in a direction along the respective angled portions. Hereby, one of the support portions of the second triangularly shaped support bracket is arranged at a shorter distance from the rail attachment portion compared to the support portion of the first triangularly shaped support bracket, while the other one of the support portions of the second triangularly shaped support bracket is arranged at a larger distance from the rail attachment portion compared to the support portion of the first triangularly shaped support bracket.

According to an example embodiment, the pair of triangularly shaped support brackets may be spaced apart from each other in a direction perpendicular to a plane defined by the triangular shape formed by the respective support brackets. Hence, the pair of triangularly shaped support brackets are preferably spaced apart from each other along the longitudinal extension of the frame rail.

According to an example embodiment, the first triangularly shaped support bracket may comprise a second battery module support portion. Preferably, and according to an example embodiment, the battery module support portions of the first triangularly shaped support bracket may be arranged adjacent to each other. Hereby, the above described pseudo-three-point suspension is achieved. By providing two battery module support portions on the first triangularly shaped support bracket will increase the stiffness of the battery module support arrangement.

According to an example embodiment, the second battery module support portion of first triangularly shaped support bracket may be arranged at a position between the pair of battery module support portions of the second triangularly shaped support bracket, as seen in a direction along the respective angled portions.

According to an example embodiment, the battery module support portions of the first and second triangularly shaped support brackets may be arranged on an upper surface of the respective angled portion. Hereby, corresponding support portions of the battery module can rest on the battery module support portions of the triangularly shaped support brackets. This will simplify installation and maintenance as the accessibility is improved when being able to reach the support portions "from above." Preferably, each of the battery module support portions may thus comprise an upwardly facing surface for supporting the battery module.

According to an example embodiment, each of the rail attachment portions may form a rail attachment surface arranged for abutment with the longitudinally extending frame rail, each rail attachment surface being non-parallel with the upwardly facing surface of the battery module support portions. According to an example embodiment, each rail attachment surface may be perpendicular to the upwardly facing surfaces of the battery module support portions. As an option, a surface normal of the upwardly facing surface may instead be arranged at an angle to the rail attachment portion.

According to an example embodiment, the second one of the triangularly shaped support brackets may further comprise at least a third battery module support portion arranged along the angled portion.

According to an example embodiment, the third battery module support portion may be arranged between the pair of battery module support portions. Preferably, and according to an example embodiment, the position of the third battery module support portion of the second triangularly shaped support bracket may correspond to the position of the at least one battery module support portion of the first triangularly shaped support bracket, as seen in a direction along the respective angled portions.

An advantage is that the third battery module support portion can be used for connection to a second battery module. An improved modularity of the battery module support arrangement is thus achieved as further battery modules can be attached if the wheelbase is sufficiently large. The second triangularly shaped support bracket is thus, together with the first triangularly shaped support bracket, supporting a first battery module, while at the same time being able to support a second battery module on the other side of the second triangularly shaped support bracket compared to the position of the first battery module.

According to an example embodiment, the battery module support arrangement may further comprise an elongated cross member connected to the first one of the triangularly shaped support brackets at a position vertically below the rail attachment portion, the cross member extending in a direction away from the lower end portion.

An advantage is that the cross member can be attached to a corresponding triangularly shaped support bracket on the other side of the frame rail, as seen in a transversal direction of the frame rail. Hereby, an improved strength of the battery module support arrangement is achieved as torque loads and bending loads can be efficiently absorbed. The frame is also less exposed to dynamic loads as well as side collision loads.

According to an example embodiment, the battery module support arrangement may further comprise a vertical protection wall connected between the lower end portions of the pair of triangular shaped support brackets, the vertical protection wall comprising a longitudinal force distribution structure extending between the pair of triangularly shaped support brackets. Preferably, and according to an example embodiment, the vertical protection wall may further comprise a vertical force distribution structure arranged between the pair of triangularly shaped support brackets. Hereby, the battery module is provided with an improved protection against side collisions.

According to a second aspect, there is provided a chassis arrangement for an electrified heavy vehicle, the chassis arrangement comprising a chassis frame with at least one rail extending in a longitudinal direction of the chassis arrangement; at least one battery module for propulsion of the heavy vehicle; and a battery module support arrangement according to any one of the embodiments described above in relation to the first aspect, wherein the rail attachment portion connects the battery module support arrangement to the rail and wherein the at least one battery module is supported by the pair of triangularly shaped support brackets at the battery module support portions.

According to a third aspect, there is provided an electrified heavy vehicle comprising a chassis arrangement according to the above described second aspect.

Effects and features of the second and third aspects are largely analogous to those described above in relation to the first aspect. Further features of and advantages will become apparent when studying the appended claims and the following description. The skilled person will realize that different features may be combined to create embodiments other than those described in the following without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
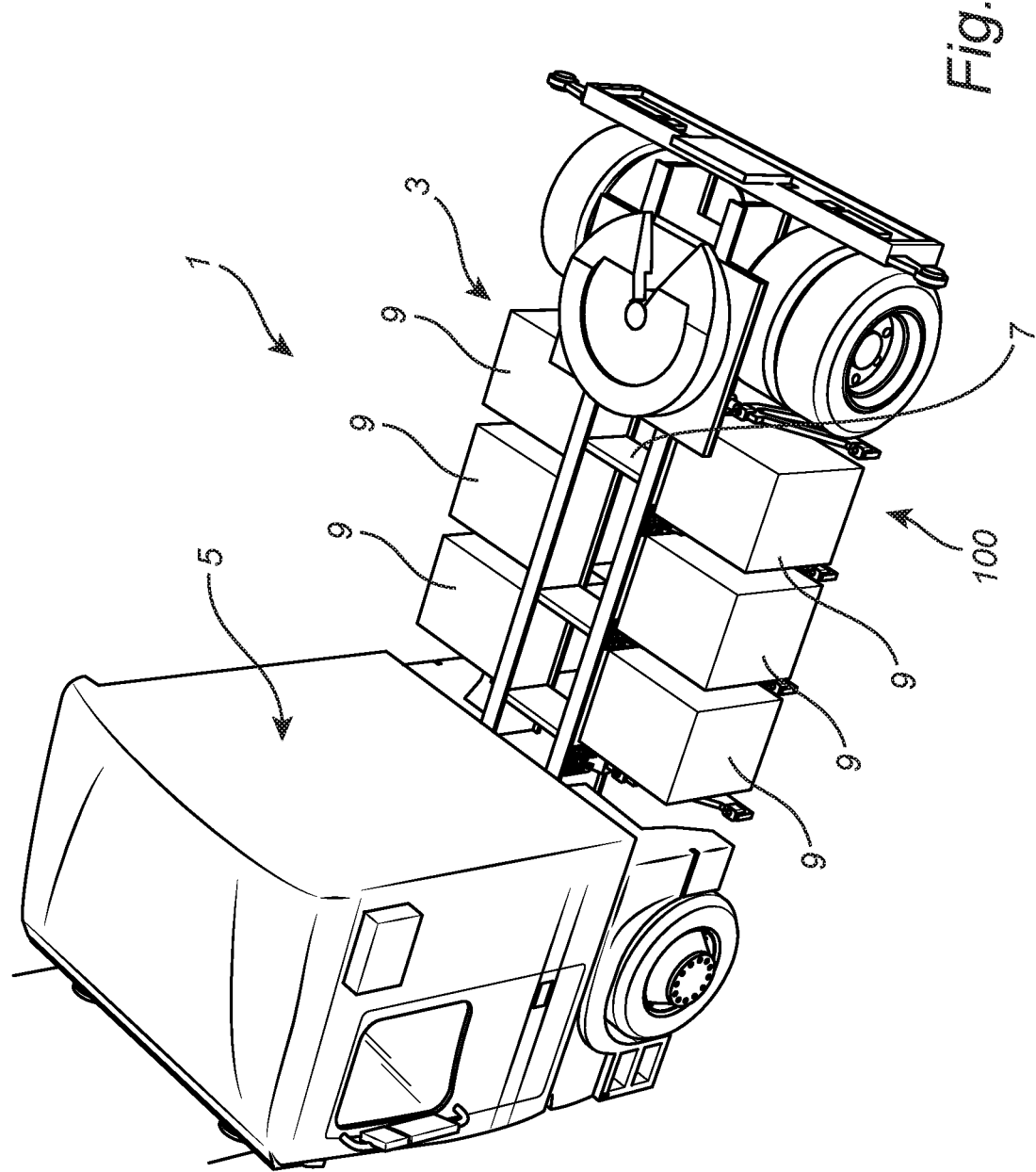
FIG. 1 is a perspective view of an electrified heavy vehicle according to an embodiment of the present invention, in the form of a truck comprising a chassis arrangement according to an example embodiment of the present invention.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference characters refer to like elements throughout the description.

FIG. 1 schematically shows an electrified heavy vehicle, here in the form of a truck 1, comprising a chassis arrangement 3 and a vehicle body 5 supported by the chassis arrangement 3. As is schematically indicated in FIG. 1, the chassis arrangement 3 comprises a chassis frame 7, battery modules 9, and a battery module support arrangement 100.

Figure 2:
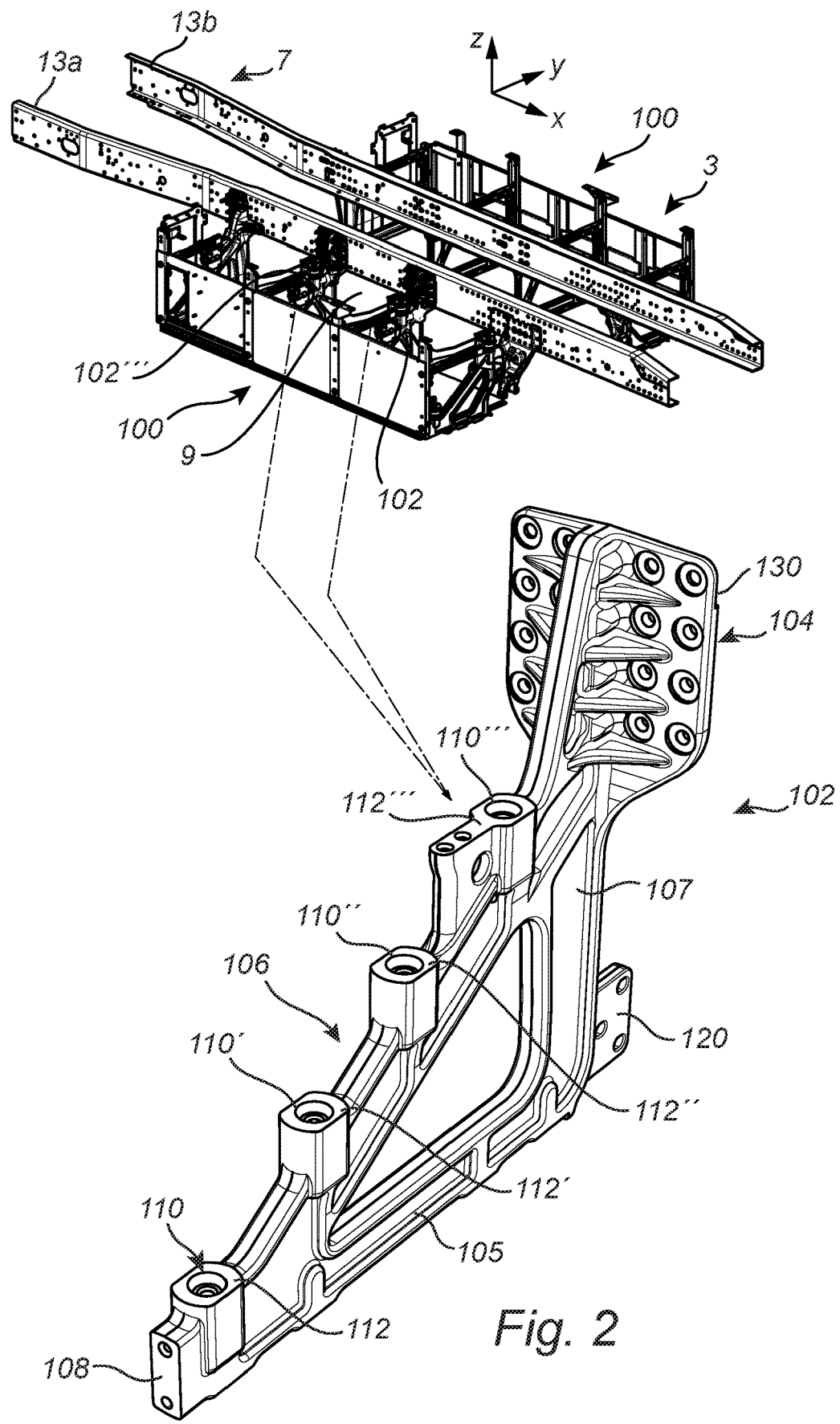
FIG. 2 is a schematic partial view of the chassis arrangement in FIG. 1, including details of a triangularly shaped support bracket according to an example embodiment.

FIG. 2 schematically shows a part of the chassis arrangement 3 in FIG. 1, with the battery modules 9 partially removed (no battery cells, etc.) to provide a better view of the battery module support arrangement 100. As can be seen in FIG. 2, the chassis frame 7 comprises rails 13a-b extending in the longitudinal direction (the X-direction) of the chassis arrangement 3. A battery module support arrangement 100 is attached to each side of the rails 13a-b for supporting one or more battery modules 9. Due to the weight of the battery modules 9, the battery module support arrangements 100 are designed to withstand substantial loads, such as may occur in the X-direction and/or Y-direction in the event of a crash and in the Z-direction during normal operation of the vehicle.

As is depicted in FIG. 2, each battery module 9 is supported by a pair of triangularly shaped support brackets 102, 102'. The pair of triangularly shaped support brackets 102, 102' are spaced apart from each other along the X-direction of the chassis arrangement. An example embodiment of the triangularly shaped support brackets 102 is depicted in detail in FIG. 2. The triangularly shaped support bracket 102 comprises a rail attachment portion 104. As can be seen, the rail attachment portion 104 comprises a plurality of openings 105 for receiving fastening elements (not shown) such as screws, bolts or rivets, etc. The rail attachment portion 104 thus connects the triangularly shaped support bracket 102 to the rail 13 by means of the fastening elements, such that a rail attachment surface 130 of the rail attachment portion 104 is arranged for abutment with the rail 13a. The triangularly shaped support bracket 102 further comprises a vertical portion 107, a horizontal portion 105, and an angled portion 106 extending downwardly between the rail attachment portion 104 and a lower end portion 108. Also, the triangularly shaped support bracket 102 comprises a cross member support portion 120 arranged at the intersection of the horizontal portion 105 and the vertical portion 107. The cross member support 120 will be described in further detail below with reference to FIG. 3.

As is further depicted in FIG. 2, the triangularly shaped support bracket 102 comprises at least one battery module support portion 110, 110', 110", 110'" positioned along the angled portion 106. In the illustration of FIG. 2, the triangularly shaped support bracket 102 comprises a first, second, third, and fourth battery module support portions. According to the example embodiment depicted in FIG. 2, the battery module support portions 110, 110', 110", 110'" are arranged on an upper surface of the respective angled portion for supporting the battery module (illustrated in further detail in FIGS. 4A-4D). The battery module support portions 110, 110', 110", 110'" preferably comprises an upwardly facing surface 112, 112', 112", 112'". A surface normal of the upwardly facing surface 112, 112', 112", 112'" is non-parallel with a surface normal of the rail attachment surface 130, preferably perpendicular to the surface normal of the rail attachment surface 130.

Figure 3:
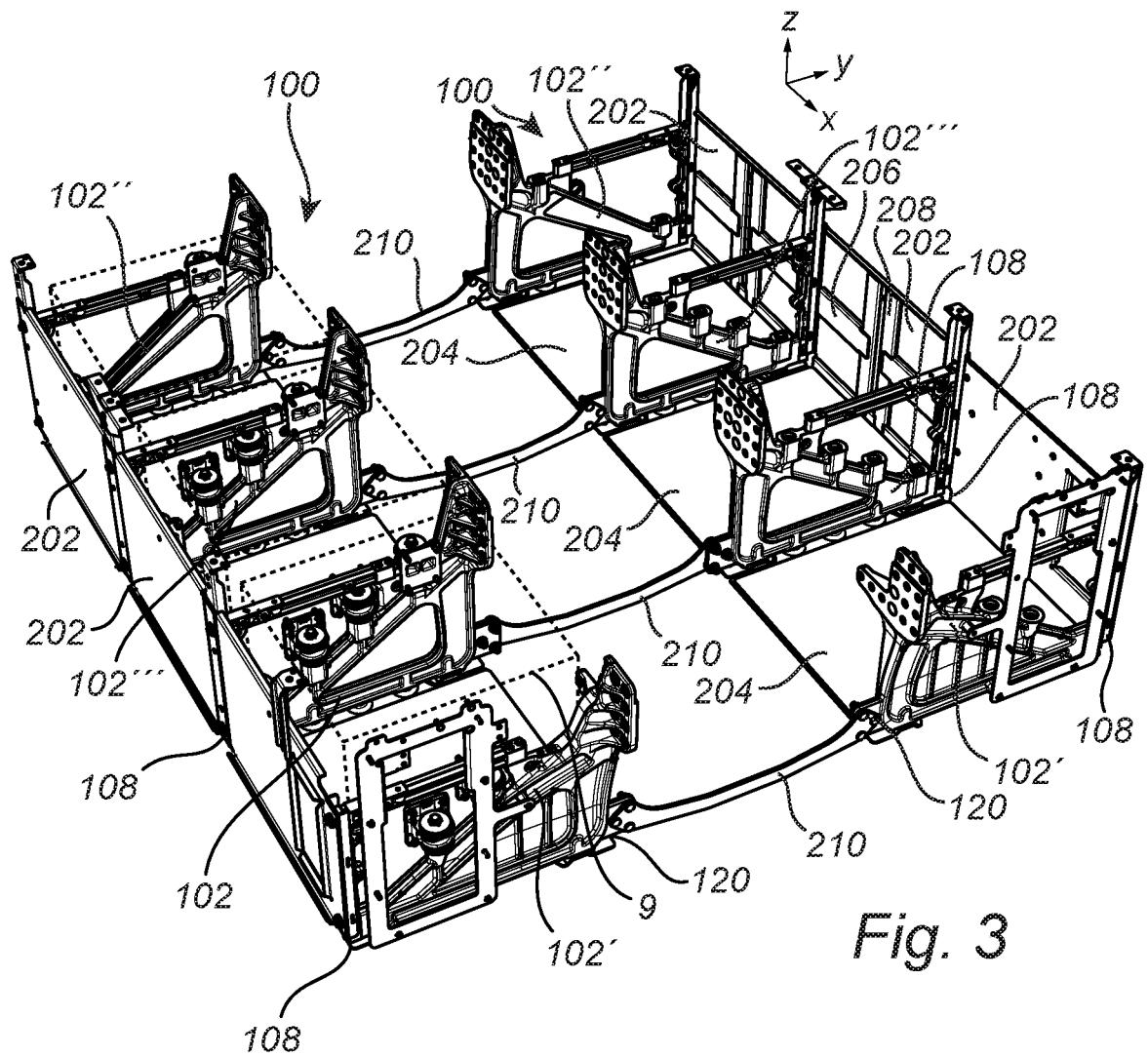
FIG. 3 is a detailed perspective view of the battery module support arrangement according to an example embodiment.

Turning to FIG. 3, which is a detailed perspective view of the battery module support arrangement according to an example embodiment. The battery modules 9 are in FIG. 3 depicted in dashed lines, and the rails 13a-b have been omitted for simplifying the illustration. In a similar manner as for the illustration in FIG. 2, the battery module support arrangement 100 comprises four triangularly shaped support brackets on each side of the rails. According to the embodiment depicted in FIG. 3, the outermost triangularly shaped support brackets 102', 102" only comprises two battery module support portions. One of the outermost triangularly shaped support brackets 102' comprises two battery module support portions arranged on an upper and lower position on the angled portion, while the other one of the outermost triangularly shaped support brackets 102" comprises two battery module support portions arranged on a center portion of the angled portion. The two triangularly shaped support brackets 102, 102" positioned between the outermost triangularly shaped support brackets 102', 102" are preferably arranged as depicted in detail in FIG. 2.

Furthermore, the battery module support arrangement 100 comprises vertical protection walls 202 and floor walls 204 extending between the triangularly shaped support brackets 102, 102', 102", 102'" in the longitudinal direction of the rails 13a, 13b. The vertical protection walls 202 and floor walls 204 protect the battery modules from dirt and stones during operation and are connected to the lower portion 108 of the triangularly shaped support brackets 102, 102', 102", 102'". As is depicted in FIG. 3, the vertical protection walls 202 comprise a longitudinal force distribution structure 206 extending in the longitudinal direction between a pair of triangularly shaped support brackets. The vertical protection walls 202 further comprise a vertical force distribution structure 208 arranged between a pair of triangularly shaped support brackets. The vertical force distribution structure 208 extends in the vertical direction (Z-direction). The longitudinal 206 and vertical 208 force distribution structures are arranged for protecting the battery modules 9 during, e.g., a side collision and are attached to the vertical protection wall. According to a preferred example, the vertical protection walls 202 are connected to the triangularly shaped support brackets 102, 102', 102", 102'" via bushings. Hereby, the vertical protection walls will not contribute to a too rigid battery module support arrangement. The floor walls 204 are, however preferably fixed to the triangularly shaped support brackets 102, 102', 102", 102'".

As is also depicted in FIG. 3, the battery module support arrangement 100 comprises elongated cross members 210 connected between triangularly shaped support brackets on a respective side of the rails. The elongated cross members 210 are connected to the cross member support portion 120 of the respective triangularly shaped support brackets and provides an increased stiffness for the battery module support arrangement 100, in particular for increasing the torsional and bending rigidity.

Figure 4A:
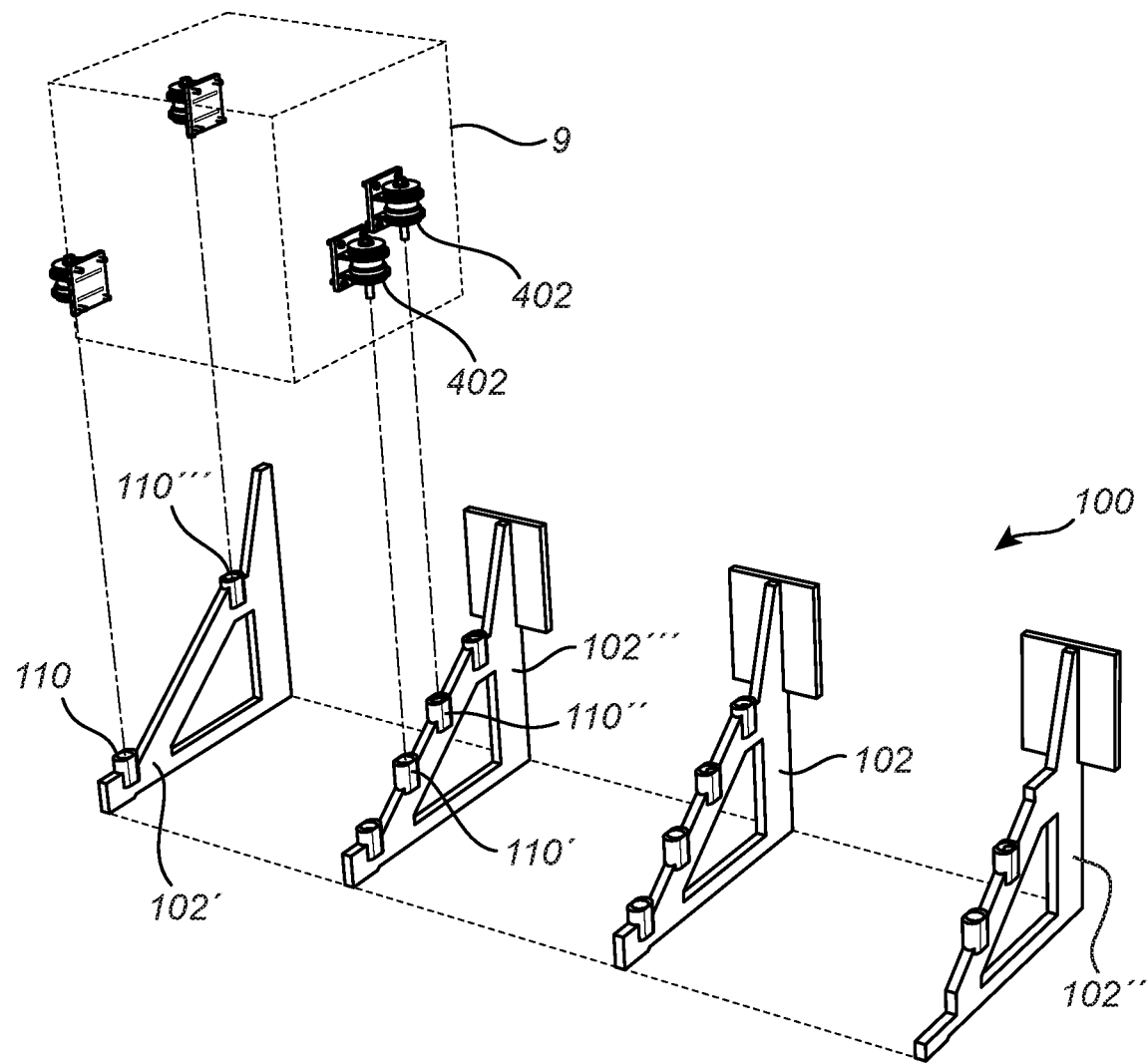
FIGS. 4A-4D are perspective views of the connection of battery modules to the battery module support arrangement according to an example embodiment.

Reference is now made to FIGS. 4A-4D illustrating the connection of the battery modules 9 to the battery module support arrangement 100. As is illustrated in FIG. 4A, a first battery module 9 is connected to a first 102' and second 102'" triangularly shaped support bracket. In particular, the battery module 9 comprises bushings 402 for connection with the battery module support portions of the triangularly shaped support brackets. The first battery module 9 is connected to the outermost battery module support portions 110, 110'" of the first triangularly shaped support bracket 102'. The outermost battery module support portions 110, 110'" will in the following also be referred to as the first 110 and fourth 110'" battery module support portion, respectively. The first battery module 9 is also connected to the inner battery module support portions 110', 110" of the second triangularly shaped support bracket 102'". The inner battery module support portions 110', 110" will in the following also be referred to as the second 110' and third 110" battery module support portion, respectively. By means of the connection of the first battery module 9, a suspension substantially in the form of a triangle is obtained. As the second 110' and third 110" battery module support portions are arranged adjacent each other, they can be replaced by a single battery module support portion, a suspension in the form of a three-point suspension can be obtained.

The first battery module support portion 110 of the first triangularly shaped support bracket 102' is thus arranged at a different position relative to the second battery module support portion 110' of the second triangularly shaped support bracket 102''', as seen along the respective angled portions. The position of the first battery module support portion 110 of the first triangularly shaped support bracket 102' preferably corresponds to the first battery module support portion 110 of the second triangularly shaped support bracket 102". The same applies for the second 110', third 110", and fourth 110''' battery module support portions, i.e., they are each arranged on substantially the same position on their respective triangularly shaped support bracket.

Figure 4B:
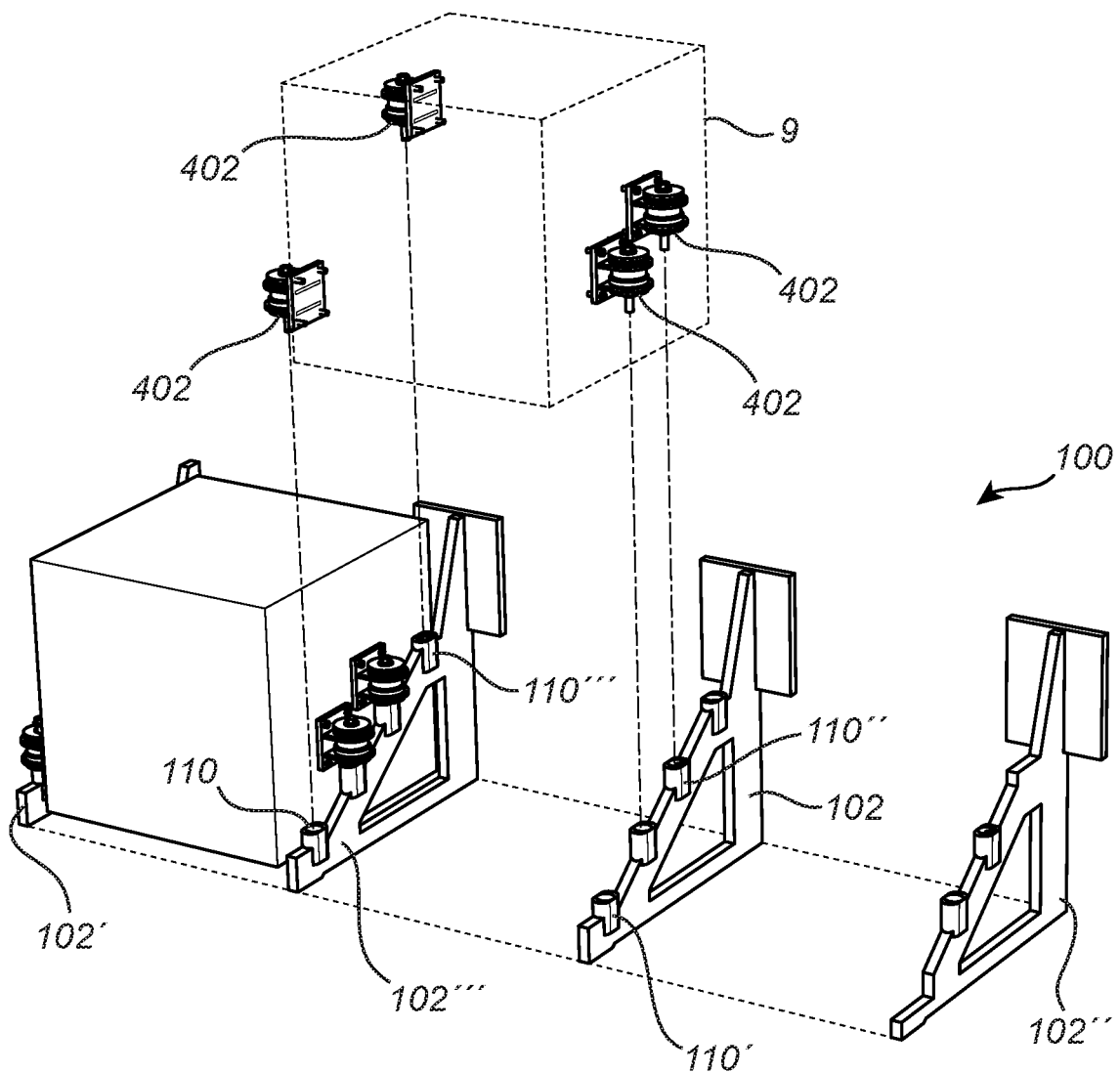

Turning to FIG. 4B, a second battery module 9 is connected to the battery module support arrangement 100. The bushings 402 of the battery module 9 is connected to the first 110 and fourth 110''' battery module support portions of the second triangularly shaped support bracket 102''', as well as to the second 110' and third 110" battery module support portions of the third triangularly shaped support bracket 102. Hence, the battery module support portions 110, 110', 110", 110''' of the second triangularly shaped support bracket 102''' support a battery module on a respective side thereof in the longitudinal direction.

Figure 4C:
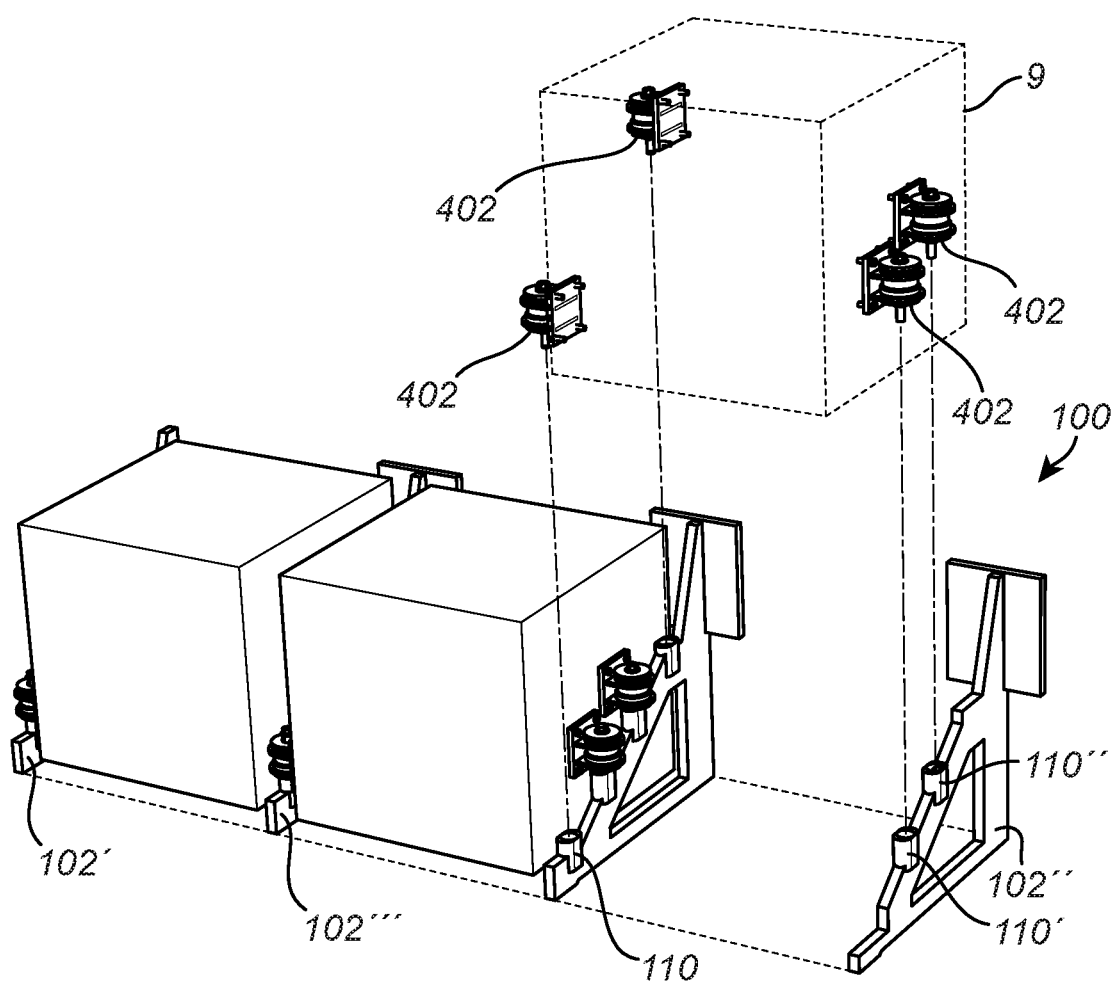

Turning to FIG. 4C, a third battery module 9 is connected to the battery module support arrangement 100. The bushings 402 of the battery module 9 is connected to the first 110 and fourth 110''' battery module support portions of the third triangularly shaped support bracket 102, as well as to the second 110' and third 110" battery module support portions of the fourth triangularly shaped support bracket 102". Hence, the battery module support portions 110, 110', 110", 110''' of the third triangularly shaped support bracket 102 support a battery module on a respective side thereof in the longitudinal direction.

Figure 4D:
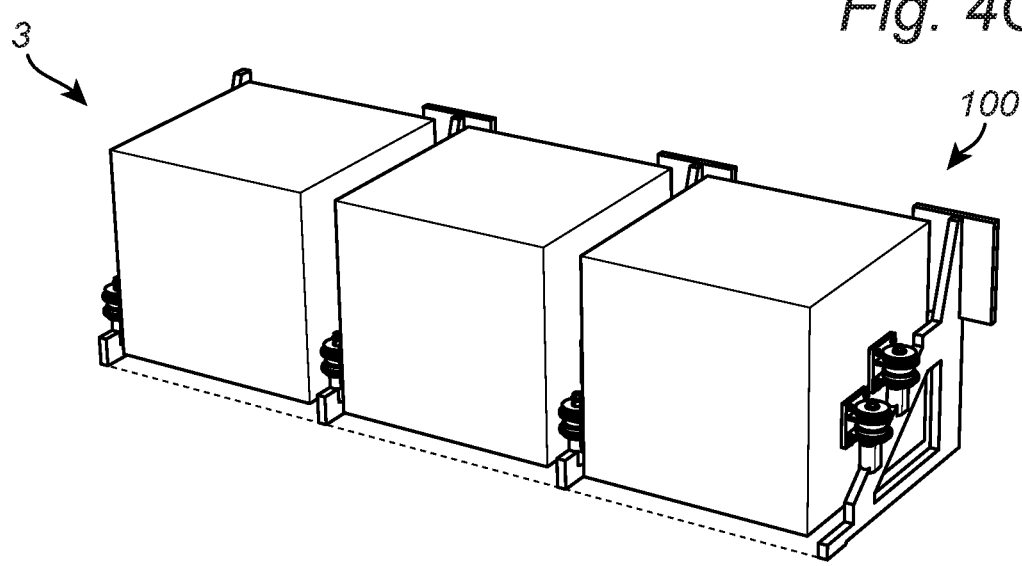

The assembled configuration chassis arrangement 3 is depicted in FIG. 4D, and the skilled person thus realize that further battery modules can be connected to the battery module support arrangement 100 by adding further triangularly shaped support brackets in the longitudinal direction of the rails. An improved modularity is thus achieved.

It is to be understood that the present disclosure is not limited to the embodiments described above and illustrated in the drawings; rather, the skilled person will recognize that many changes and modifications may be made within the scope of the appended claims.

The invention claimed is:

1. A battery module support arrangement for supporting a battery module to a longitudinally extending frame rail of an electrified heavy vehicle, the battery module support arrangement comprising:
a pair of triangularly shaped support brackets spaced apart from each other, each of the triangularly shaped support brackets comprising a rail attachment portion for connecting the triangularly shaped support bracket to the longitudinally extending frame rail, and an angled portion extending downwardly between the rail attachment portion and a lower end portion of the triangularly shaped support bracket, the pair of triangularly shaped support brackets comprising a first support bracket and a second support bracket, wherein:

the first support bracket comprises at least one battery module support portion positioned along the angled portion of the first support bracket, and the second support bracket comprises a pair of battery module support portions positioned along the angled portion of the second support bracket, the battery module support portion of the first support bracket is arranged at a different position along the angled portion compared to the position of at least one of the battery module support portions of the second support bracket, the second support bracket further comprises at least a third battery module support portion arranged along the angled portion, wherein the third battery module support portion is arranged between the pair of battery module support portions, a first battery module is configured to be connected to the at least one battery module support portion of the first one of the triangularly shaped support brackets and to the pair of battery module support portions of the second one of the triangularly shaped support brackets, and a second battery module is configured to be connected to the third battery module support portion of the second one of the triangularly shaped support brackets.

2. The battery module support arrangement of claim 1, wherein the battery module support portion of the first support bracket is arranged at a position between the battery module support portions of the second support bracket, as seen in a direction along the respective angled portions.

3. The battery module support arrangement of claim 1, wherein the pair of triangularly shaped support brackets are spaced apart from each other in a direction perpendicular to a plane defined by the triangular shape formed by the respective support brackets.

4. The battery module support arrangement of claim 1, wherein the first triangularly shaped support bracket comprises a second battery module support portion.

5. The battery module support arrangement of claim 4, wherein the battery module support portions of the first triangularly shaped support bracket are arranged adjacent to each other.

6. The battery module support arrangement of claim 4, wherein the second battery module support portion of the first support bracket is arranged at a position between the pair of battery module support portions of the second support bracket, as seen in a direction along the respective angled portions.

7. The battery module support arrangement of claim 1, wherein the battery module support portions of the first and second support brackets are arranged on an upper surface of the respective angled portion.

8. The battery module support arrangement of claim 7, wherein each of the battery module support portions comprises an upwardly facing surface for supporting the battery module.

9. The battery module support arrangement of claim 8, wherein each of the rail attachment portions forms a rail attachment surface arranged for abutment with the longitudinally extending frame rail, each rail attachment surface being non-parallel with the upwardly facing surface of the battery module support portions.

10. The battery module support arrangement of claim 9, wherein each rail attachment surface is perpendicular with the upwardly facing surfaces of the battery module support portions.

11. The battery module support arrangement of claim 1, wherein the position of the third battery module support portion of the second support bracket corresponds to the position of the at least one battery module support portion of the first support bracket, as seen in a direction along the respective angled portions.

12. The battery module support arrangement of claim 1, further comprising an elongated cross member connected to the first support bracket at a position vertically below the rail attachment portion, the cross member extending in a direction away from the lower end portion.

13. The battery module support arrangement of claim 1, further comprising a vertical protection wall connected between the lower end portions of the pair of triangular-shaped support brackets, the vertical protection wall comprising a longitudinal force distribution structure extending between the pair of triangularly shaped support brackets.

14. The battery module support arrangement of claim 13, wherein the vertical protection wall further comprises a vertical force distribution structure arranged between the pair of triangularly shaped support brackets.

15. A chassis arrangement for an electrified heavy vehicle, the chassis arrangement comprising:
a chassis frame with at least one rail extending in a longitudinal direction of the chassis arrangement;
a first battery module and a second battery module for propulsion of the heavy vehicle; and
a battery module support arrangement, comprising:
a pair of triangularly shaped support brackets spaced apart from each other, each of the triangularly shaped support brackets comprising a rail attachment portion for connecting the triangularly shaped support bracket to the longitudinally extending frame rail, and an angled portion extending downwardly between the rail attachment portion and a lower end portion of the triangularly shaped support bracket, the pair of triangularly shaped support brackets comprising a first support bracket and a second support bracket, wherein:
the first support bracket comprises at least one battery module support portion positioned along the angled portion of the first support bracket, and the second support bracket comprises a pair of battery module support portions positioned along the angled portion of the second support bracket,
the battery module support portion of first support bracket is arranged at a different position along the angled portion compared to the position of at least one of the battery module support portions of the second support bracket,
the second support bracket further comprises at least a third battery module support portion arranged along the angled portion, wherein the third battery module support portion is arranged between the pair of battery module support portions,
the first battery module is configured to be connected to the at least one battery module support portion of the first one of the triangularly shaped support brackets and to the pair of battery module support portions of the second one of the triangularly shaped support brackets, and
the second battery module is configured to be connected to the third battery module support portion of the second one of the triangularly shaped support brackets;
wherein the rail attachment portion connects the battery module support arrangement to the rail and wherein the first battery module and the second battery module are supported by the pair of triangularly shaped support brackets at the battery module support portions.

16. An electrified heavy vehicle, comprising:
a chassis arrangement for an electrified heavy vehicle, the chassis arrangement comprising:
a chassis frame with at least one rail extending in a longitudinal direction of the chassis arrangement;
a first battery module and a second battery module for propulsion of the heavy vehicle; and
a battery module support arrangement, comprising:
a pair of triangularly shaped support brackets spaced apart from each other, each of the triangularly shaped support brackets comprising a rail attachment portion for connecting the triangularly shaped support bracket to the longitudinally extending frame rail, and an angled portion extending downwardly between the rail attachment portion and a lower end portion of the triangularly shaped support bracket, the pair of triangularly shaped support brackets comprising a first support bracket and a second support bracket, wherein:
the first support bracket comprises at least one battery module support portion positioned along the angled portion of the first support bracket, and the second support bracket comprises a pair of battery module support portions positioned along the angled portion of the second support bracket,
the battery module support portion of first support bracket is arranged at a different position along the angled portion compared to the position of at least one of the battery module support portions of the second support bracket,
the second support bracket further comprises at least a third battery module support portion arranged along the angled portion, wherein the third battery module support portion is arranged between the pair of battery module support portions,
the first battery module is configured to be connected to the at least one battery module support portion of the first one of the triangularly shaped support brackets and to the pair of battery module support portions of the second one of the triangularly shaped support brackets, and
the second battery module is configured to be connected to the third battery module support portion of the second one of the triangularly shaped support brackets;
wherein the rail attachment portion connects the battery module support arrangement to the rail and wherein the first battery module and the second battery module are supported by the pair of triangularly shaped support brackets at the battery module support portions.

* * * * *